May 24, 1966  K. A. SWANSTROM  3,252,742
SPHERICAL BEARINGS AND THE LIKE
Filed March 19, 1962  2 Sheets-Sheet 1
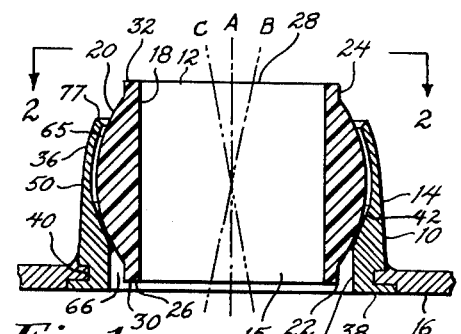
Fig.1.
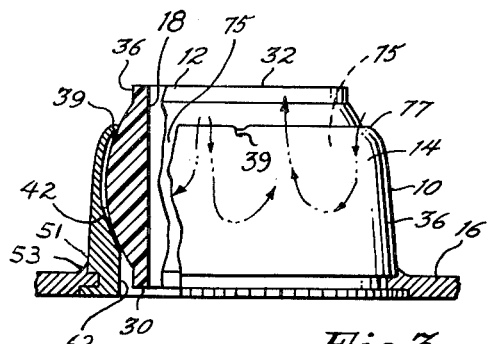
Fig.3.
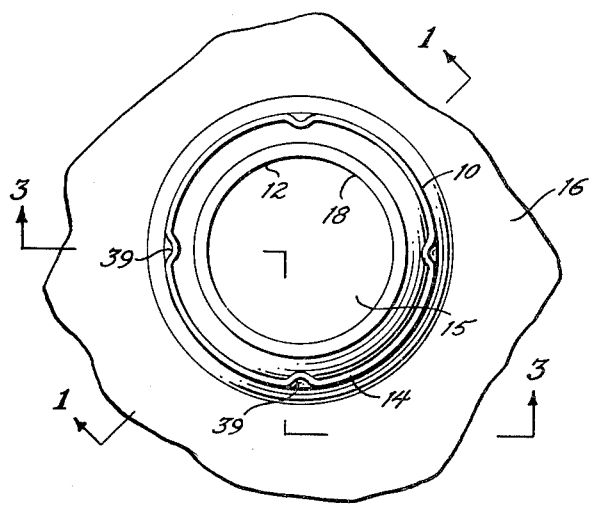
Fig.2.
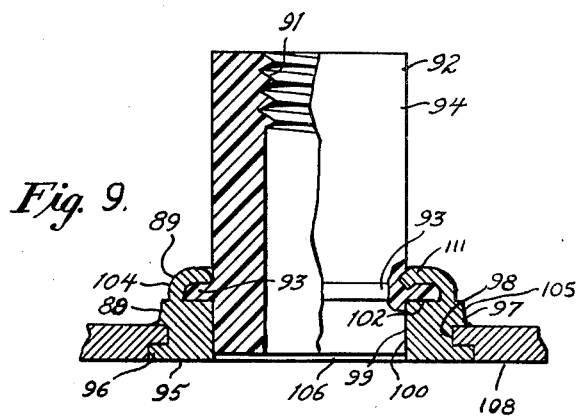
Fig. 9.
INVENTOR.
KLAS ARENT SWANSTROM
BY
HIS ATTORNEY.

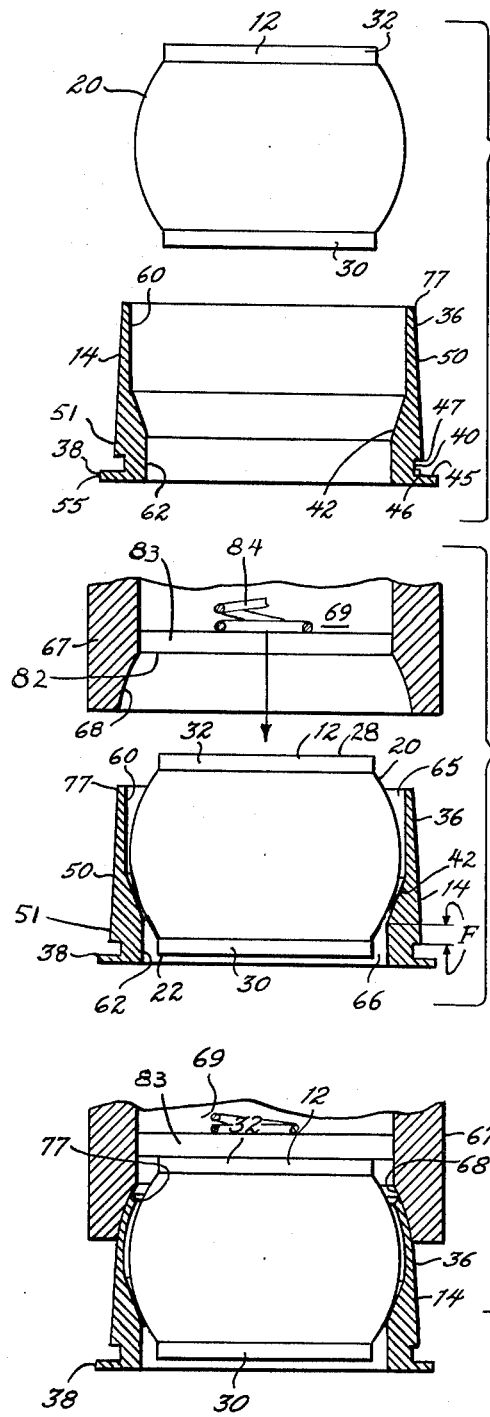
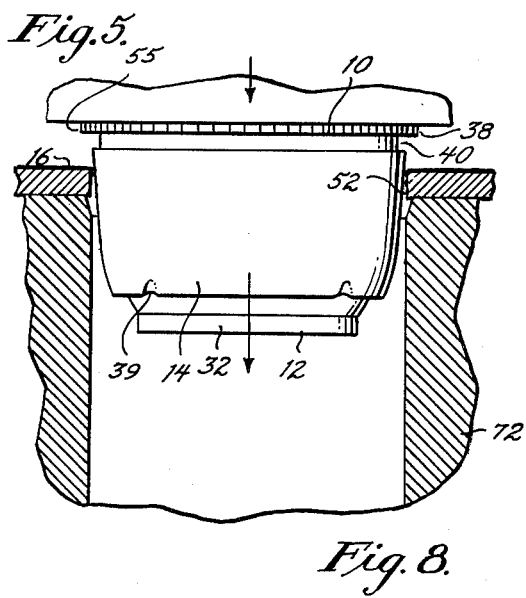
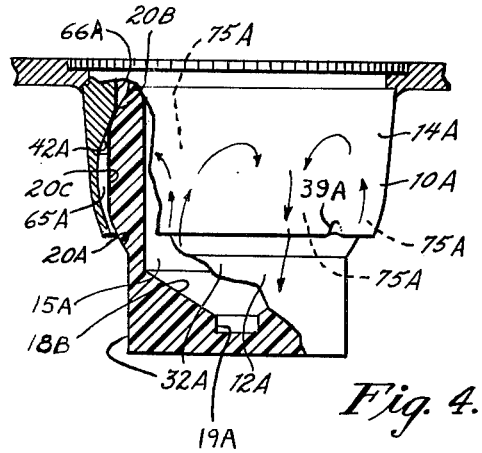

United States Patent Office 3,252,742
Patented May 24, 1966

3,252,742
SPHERICAL BEARINGS AND THE LIKE
Klas Arent Swanstrom, Doylestown, Pa., assignor to Spyraflo, Inc., Miami, Fla., a corporation of Delaware
Filed Mar. 19, 1962, Ser. No. 180,903
11 Claims. (Cl. 308—72)

This invention relates to the securing of plastic and other devices to relatively thin sheeted plates and it is an object of this invention to provide improved retainers for securing such devices.

Many devices are being fabricated today utilizing sheet metal plates through which extend rotating shafts of small diameters, such as 1/32 of an inch to 1/2 of an inch. Providing suitable, self-aligning bearing units for such shafts, positioned accurately on the sheet metal plates, has heretofore been expensive. It is a further object of this invention to provide a more economical self-aligning bearing unit.

With the use of plastic bearings, it is desirable to provide a cooling arrangement to prevent overheating of the bearings especially if they are intended for operation at ambient temperatures above normal room temperature and/or high speed or load. Another object of this invention, is to provide, as an integral part of the means for retaining the plastic bearing, an air cooling arrangement.

Also, with bearings formed from certain plastics and retainers of metal, the bearings tend to expand, when both are heated, more than the retainers. It is another object of my invention to provide for the radial expansion of the bearing so that the original shaft to bearing clearance is not materially reduced during operation at temperatures above normal room temperature.

Self-alignment of the bearings is a desirable feature but a bearing which can move freely so that its longitudinal axis will be at any angle to that of the retainer has the disadvantage that the hole through which the shaft is intended to be placed may be turned out of alignment with the corresponding hole in the retainer, resulting in the hole for the shaft being inaccessible to the shaft until the bearing is rocked to make the hole accessible. Therefore, it is still another object of this invention to provide an arrangement between the plastic bearing and the retainer, whereby the hole in the bearing will always be accessible to the shaft.

My improved self-aligning bearing unit for a shaft comprises a retainer in which is disposed a plastic bearing having a bearing surface defining a hole to receive the shaft. The retainer comprises a head adapted to be driven flush with the top surface of the sheet metal plate to which it is desired to secure the bearing. Further, the retainer is provided with a pilot and an undercut recess between the head and the pilot for receiving the plate material displaced by the head when driven into the sheet metal plate.

The pilot includes an outside tapered surface portion the diameter of which is smaller, at its forward end, than that of the bore in the plate to receive the retainer but whose diameter, adjacent the head, is larger than the bore to receive it, to form an interference fit therewith for properly centering the retainer with respect to the bore. The bearing has an outside surface which is, in part, spherical and is received in a part of the retainer having a shape which allows angular movement or rocking of the bearing to align its longitudinal axis with that of the shaft at an angle to the longitudinal axis of the retainer. The inner surface portion of the retainer (that is radially aligned with the tapered outer surface portion which provides the interference fit) is spaced from the outer surface of the plastic bearing so that deformation of the retainer due to the interference fit is not transferred or imposed upon the plastic bearing.

When the self-aligning bearing unit is placed in the metal plate bore, the unit comes to rest with the pilot extending part-way through the bore and the retainer head spaced from the upper surface of the plate. An anvil is placed in contact with the lower surface of the plate and the anvil has a hole in it to accommodate the pilot. Thereafter, a punch drives the head into the plate until the top of the head is flush with the top of the sheet metal plate. This punching securely embeds the head in the plate and causes the material displaced by the head to enter the undercut recess.

The retainer is formed by centrally drilling it to form a tapered internal seat for the plastic bearing and an internal cylindrical wall both of which define the inner surface of the pilot. The plastic bearing is placed upon the tapered seat and the end of the pilot which is smallest in diameter is then bent carefully toward the spherical surface of the bearing, but spaced from the associated surface. Thereafter, spaced parts of the pilot on the other side of the medial plane of the bearing from the seat, are staked into engagement with the bearing to frictionally retain the plastic bearing and prevent rotation thereof relative to the retainer.

It has been the practice previously to secure insulator feed-throughs for electrical wiring and the like devices to thin sheet metal plates by drilling bores in the sheet metal plates and embedding parts of the devices in the sheet metal plates with other parts of the devices extending through the bore. In the fabrication of such assemblies, the centers of the bores in the sheet metal plates are accurately determined and the bores in the plates are accurately drilled or pressed out using these centers as guides. However, it sometimes happens that the devices to be embedded in the sheet metal plates have not been accurately positioned with respect to the bore, due to the large clearance which sometimes is used between these parts. In this invention, the tapered pilot which is provided and the interference fit that results positively aligns the devices with the centers of the bores during assembly of the devices to the plates.

The principles of the invention and the best modes in which I have contemplated applying such principles will further appear from the following description and the accompanying drawings in illustration thereof.

In the drawings,

FIG. 1 is an enlarged vertical sectional view of the improved self-aligning bearing unit of this invention secured to a sheet metal plate;

FIG. 2 is a top view of the bearing unit illustrated in FIG. 1;

FIG. 3 is a view, partly in section and partly in side elevation, of the bearing unit illustrated in FIGS. 1 and 2;

FIG. 4 is an enlarged view, partly in section and partly in elevation of a combined thrust (axial load) and journal (radial load) bearing modification of the unit illustrated in FIGS. 1 to 3;

FIG. 5 is an exploded view, partly in section and partly in elevation, of the embodiment shown in FIGS. 1 to 3 and illustrating the bearing prior to assembly to the retainer;

FIG. 6 is a vertical sectional view of the embodiment shown in FIGS. 1 to 3 and 5 and illustrating the bearing seated in the retainer and the punch for bending part of the retainer;

FIG. 7 is a vertical sectional view similar to FIG. 6 but illustrating the retainer after it has been bent by the punch;

FIG. 8 is a view, partly in section and partly in elevation, of the embodiment shown in FIGS. 1 to 3 and 5 to 7 and illustrating the bearing unit centered in the hole in the sheet metal plate as the interference fit therebetween first comes into operation, an anvil supporting the sheet metal plate and a punch for driving the retainer into the sheet metal plate; and FIG. 9 is an enlarged view, partly in section and partly in elevation, of a further modification of my invention as applied to a retainer for a plastic stand-off.

Referring to the drawings, and in particular to FIG. 1, the improved self-aligning bearing unit 10 comprises a plastic annular bearing 12 secured to an annular metallic retainer 14, the latter being driven into a thin sheet metal plate 16. The plastic bearing 12 has a central hole 15 defined by a cylindrical, internal bearing surface 18 to receive a shaft, not illustrated. The bearing 12 has an outer surface comprising a spherical portion 20 which is symmetrical (about the medial plane disposed perpendicularly to the longitudinal axis of the bearing 12). The remaining part of the outer surface of the bearing 12 is formed by cylindrical surfaces 22 and 24 which together with the corresponding portions of the internal surface 18 and end faces 26 and 28 define similar annular longitudinally extending collars 30 and 32, at opposite ends of the bearing.

The bearing 12 is secured to the retainer 14, the latter comprising an annular pilot 36 separated from a flat head or flange 38 by an undercut annular recess 40, due to the fact that a lower part of the spherical surface 20 (as viewed in FIGS. 1 and 3) is held in line contact with a tapered seat 42 (formed at the lower end of the pilot 36 and internally therein) by four staked parts or crimps 39 at the upper end portion of the pilot 36 (FIG. 3). The crimps 39 frictionally and tightly engage spaced portions of the spherical surface 20 on the side of the medial plane opposite to that of the tapered seat 42. The arcuate extent of spherical surface 20 is made sufficient so that in cooperation with the tapered seat 42 and the crimps 39 the required rocking movement of the bearing 12 may take place. The force exerted by the crimps 39, however, upon the plastic bearing is controlled to prevent deformation thereof which would result in the hole 15 becoming out of round.

The peripheral surface of the flat head 38 is formed with a plurality of serrations or knurls 55 extending the thickness of the head to facilitate driving the head into the sheet metal plate and to increase its torque resisting ability. The undercut recess 40 is defined by three straight walls, the horizontal wall 45 which also forms the underside of the head, a vertical wall 46, and a horizontal wall 47 spaced from wall 46 and coplanar with the top surface of the sheet metal plate when the retainer is secured to the plate, in the position illustrated in FIGS. 1 and 3.

As has been noted, the inner surface of the retainer is intended to contact the outer spherical surface 20 of the bearing 12 only at the line contact provided by the tapered seat 42 at one end and at the spaced crimps 39 at the other end. For radial thermal outwardly expansion of the bearing 12 there is thus provided a space 65 above this line contact (except at the crimps 39), and a space 66 below this line contact between the retainer inner surface and the plastic bearing outer surface. The space 66 is an annular space, below the line contact, into which air may enter for cooling the plastic bearing below the line contact. The space 65 above the line contact defines four elongated, curved ducts 75 separated by the crimps 39, into which cooling air may also enter, as noted diagrammatically on FIG. 3. Provision of the spaces 65 and 66 for radial expansion is important because if no such provision is made and the plastic bearing is restrained from any such radially outward expansion, the only other radial expansion possible is towards the shaft, resulting at best in reducing the clearance between the two or perhaps a failure of the bearing due to seizing of the bearing on the shaft.

The tapered outer surface 50 of the pilot 36 is shaped so that its largest diameter is adjacent the recess 40 and its smallest diameter is at the crimped end portion 77 (FIG. 6). An annular portion 51 (FIGS. 3 and 6) of the tapered outer surface 50 (between the construction lines designated by the arrows and the letter F in FIG. 6) provides an interference fit between the retainer and the hole 52 (in the sheet metal plate 16) for centering the self-aligning bearing unit 10 with respect to the hole 52 during assembly to the plate 16. This interference fit is not so great, however, that it materially impairs successful driving of the head 38 of the retainer into the sheet metal plate 16.

The spherical outer bearing surface 20 is arranged relative to the tapered seat 42 so that the aforementioned line contact is at about the midpoint of the tapered seat 42 (and due to the spherical surface 20 remains there as the longitudinal axis of the bearing 12 shifts relative to that of the retainer 14).

The aforementioned tapered surface 51 (to provide the interference fit) is radially aligned with a part of the space 66 to make the interference fit start (as viewed in FIG. 6) below the line contact between outer surface 20 and tapered seat 42, or in other words (as viewed in FIG. 8), after this plane of line contact has entered the hole 52 in the sheet metal plate. Preferably, the interference fit exists only from the horizontal plane of the juncture of the tapered surface 42 and the cylindrical surface 62 to the horizontal plane of the wall 47 (of the recess 40). When the interference fit is so located any deformation of the retainer which takes place when the bearing unit 10 is driven into the sheet metal plate will not be imposed on the plastic bearing 12 because of the space 66. Thus, the plastic bearing 12 is not deformed and its hole 15 is maintained round during and after the embedding of the retainer.

It should be noted that if a construction were to be used which restrains radially outward expansion of the bearing 12 but the clearance between the shaft and the bearing 12 would be made initially large to accommodate radially inward expansion of the bearing 12 at high temperatures, the clearance at normal room temperature would be larger than that which is desirable for the best bearing characteristics. That is, the smaller the clearance between bearing surface and shaft, the less the probability of undesirable vibrations resulting.

Thus, the aforedescribed self-aligning bearing unit is intended to operate at varying shaft speeds and loads and in ambient temperatures of up to about 185° F. At such temperatures, the plastic bearing 12 expands radially outward into the spaces 65 and 66 above and below the plane of line contact between the bearing 12 and the tapered seat 42. The clearance between the bearing surface 18 and the shaft does decrease somewhat at high temperatures from the clearance at room temperature especially in the two planes which include the line contact between the tapered seat 42 and the spherical surface 20 and the contact between the crimps 39 and the spherical surface 20, but this radially inward expansion does not materially influence the operation of the bearing unit because the bulk of the expansion is accommodated radially outwardly by expansion into the spaces 65 and 66. Further, since the crimps 39 engage the bearing only at 4 spaced places and in substantially point contact, they provide a minimum amount of restraint on this radially outward expansion.

As to the portion of the annular space 66 below the lower edge of the tapered surface 42, that is, below the juncture between the tapered surface 42 and the cylindrical surface 62, this space has to be provided also to allow angular or rocking movement of the bearing 12 relative to a transverse axis through the medial plane. That is, the surface 62 has to be spaced from the surface 22 to permit the bearing 12 to align itself correctly. But the abutment of collar 30 with surface 62 serves another function in that by limiting rocking movement of the bearing 12 it prevents the hole 15 from becoming inaccessible to the shaft prior to assembly of the shaft thereto.

Thus, it is seen that in use, due to the clearance or space between the collar 30 and the cylindrical surface 62, the longitudinal axis A of the bearing may shift or rock relative to the retainer 14, when the latter is secured to the sheet metal plate 16, until the lower edge of collar 30 abuts a portion of the cylindrical surface 62 on one side or the other of the longitudinal bearing axis, allowing shifting of the longitudinal bearing axis A equally between B and C, in FIG. 1, or in one embodiment a total of about 10°. The end face 26 of collar 30 terminates sufficiently within the retainer that during this aligning movement it does not extend beyond the head 38. Since the diameter of the cylindrical surface 22 is less than that of the spherical surface 20, the collar 30 is free to move until it abuts surface 62. Also, so that this angular aligning movement is not impaired, the rolled or bent over upper end portion 77 of the pilot 36 (FIG. 3) terminates upon (or surrounds) a portion of the spherical surface 20 substantially short of the collar 32 and does not engage the latter during rocking of the bearing 12.

To facilitate bending of the end portion 77, the tapered seat 42 and the tapered outer surface of the pilot 36 define an angular retainer wall thickness which is greatest in the plane of the top surface (FIGS. 1 and 3) of the sheet metal plate 16, and then decreases as the distance upwardly from this surface increases. Further, the outer diameter of the head 38 is sufficiently larger than that of the bore 52 in the plate 16 to displace sufficient sheet metal into the recess 40 and embed itself properly.

While the plastic bearing 12 may be made from a Delrin material, it can also be formed from Teflon (produced by the Du Pont Company) fluorocarbon resin and from nylon. Also, the Teflon plastic may be reinforced with glass for added toughness and longer life.

The retainer 14 is formed from a suitable piece of bar stock of a suitable material, for instance aluminum or corrosion resistant steel, and cut to the required length. Thereafter, the head 38, the recess 40 and the tapered outer surface 50 of the pilot 36 are machined, the latter having a varying diameter, as hereinafter described in further detail, from the smallest diameter at the extremity of end portion 77 (FIG. 5) to the largest diameter adjacent the recess 40. Also, serrations or knurls 55 on the periphery of the head 38 are formed by suitable upsetting or pressing methods.

As an example of the interference fit which may be provided, for a bearing surface 18 defining a hole 15 to receive a shaft of ¼ inch nominal diameter, if an aluminum or similar sheet metal plate is used of about .035 to .040 inch thickness, and a diameter for the bore 52 of between .375 to .378 inch, the pilot surface is machined so that the outer diameter thereof will taper uniformly from .369 to .371 inch at the extremity of end portion 77 (FIG. 5) to about .373 to .375 inch diameter at the horizontal plane of juncture between the tapered seat 42 and the cylindrical surface 62 and, thence, tapers to about .378 to .381 inch diameter at the lower end, that is, adjacent the surface 47 or line of juncture of the pilot 36 with the recess 40 for a pilot 36 axial length of about .180 to .183 inch (measured from surface 47 to the extremity of end portion 77 in FIG. 5). Thus, it is seen that the outside diameter of the pilot surface portion 51 at or just below the plane of juncture between the tapered seat 42 and the cylindrical surface 62, where it is preferred that the interference fit will start, is about .373 to .375 inch. It is seen that any suitable outside diameter for the pilot surface 50 above the interference surface portion 51 (FIG. 5) could be used so long as the diameter is less than (or no more than) that of the bore 52.

It should be noted that the tapered outer surface portion 51 essentially passes through the plate 16 and is not a material part of the connection after the head 38 is embedded flush with one surface of the plate, although the lip 53 which is formed by a part of the flowed plate material does tightly engage a part of the surface 51, because the plate 16 thickness approximates that of the head and the recess 40. If the plate were to be thicker than illustrated, then the surface 51 would also provide torque resistance, due to the interference fit.

The inside surfaces of the retainer 14 are then formed by first centrally drilling into the stock from the end portion 77 with a drill tool (not shown) having a forward cutting edge shaped to provide the tapered seat 42 and the vertical cylindrical internal wall 60 (FIG. 5). The diameter of the drill tool is equal to the diameter of the spherical surface 20 plus the spaces 60 on both sides, these spaces being measured at the medial plane of the spherical surface 20. The tapered part of the drill forms the tapered seat 42 below the medial plane of the spherical surface. Thereafter, another drill tool is inserted from the same end, but of smaller diameter than the first, to form the vertical cylindrical surface 62, contiguous with the tapered seat 42 for encompassing the collar 30 and an adjacent part of the spherical surface 20, when the bearing 12 is assembled to the retainer 14, the diameter of the cylindrical surface 62 being larger than that of collar 30 by the amount desired for self-alignment and cooling purposes.

Assembly of the bearing to the retainer is accomplished by dropping the bearing into the retainer through the end portion 77 (the retainer 14 being supported on a suitable anvil, not illustrated) and allowing a part of the spherical surface 20 below its medial plane to seat itself on the tapered seat 42 to provide line contact therebetween.

A punch 67, referring to FIGS. 6 and 7, is then used to close the open upper end of the retainer 14 by bending or rolling the end portion 77 in spaced relation to the upper half of the spherical surface 20, reducing the part of the space 65 above its medial plane to approximately the space existing between the surfaces 20 and 60 at the medial plane. For this purpose a central spherical surface 68 of the punch 67 is used to bend or roll the upper end portion 77 of the pilot 36 toward the bearing 12, the surface 68 having a radius equal to that of the spherical surface 20, plus the space desired between surfaces 20 and 60, plus the thickness of the portion of the pilot 36, at the plane through the longitudinal axis of the retainer coincident with the lowest level reached by the punch 67 during this bending. The longitudinal axes of the bearing 12 and retainer 14 are made coincident during this bending of the end 77 by engagement of the lower, flat face 82 with the collar end face 28, the face 82 being formed on punch insert 83 slidable within the central opening 69 and biased downwardly by a spring 84. The force on the punch 67 is controlled very carefully so that only the desired amount of uniform bending results and the downward travel of the punch is limited to the extent required to accomplish the needed bending only. As illustrated, the central opening 69 also accommodates the (upper) collar 32 of the bearing during this bending.

Thereafter, a punch (not shown but similar to that illustrated in FIGS. 6 and 7) is used, having only four inwardly spaced projections about its periphery, to deform four upper edge portions of the end 77 into stakes or crimps 39 which penetrate the surface 20 and are essentially in contact with small portions (of the upper half) of the bearing 12 on the side of the medial plane opposite to that where the tapered seat 42 is located. The crimps 39 limit axial movement of the bearing 12 in the direction opposite to that limited by the seat 42. The pressure of the crimps 39 provides a frictional restraint against rotation of the bearing 12 relative to the retainer 14 due to rotation of the shaft received in the hole 15, but allows angular or rocking aligning movement. Since the crimps 39 penetrate the surface 20, during rocking the crimps 39 scratch or score the surface 20 axially. Of course, the crimps 39 and seat 42 prevent free lateral movement of the plastic bearing. The crimps 39 penetrate the spherical surface 20 enough to restrain rotation of the bearing including upon thermal expansion radially inwardly of the crimps 39 but not enough to deform the hole 15 out of round sufficiently to materially impair the bearing function of the plastic bearing.

It has also been found that the end 77 may be properly rolled or bent if the punch surface 68 is made at an angle of 45° rather than arcuate. Further, this same punch may be provided with rectangular elongated projections (the width of the surface 68) extending radial inwardly a distance sufficient to provide the crimps 39 whereby the one punch bends the end portion 77 and forms the crimps 39. Even though the fact of the modified punch is straight (not arcuate) the upper end portion 77 becomes rolled as shown in FIG. 7 and not bent at a 45° angle because the punch surface first engages the peripheral edge of end portion 77 which starts the rolling process and the force on the punch is not great enough nor is the bending distance sufficient to put the upper end portion 77 at an angle of 45° with the vertical wall 60.

With a Delrin plastic bearing 12 is has been found that best results are obtained by using a clearance of about .003 to .0045 inch on the diameter between the shaft and the hole 15 and a shaft having a surface finish of about 16 micro inches or less for shaft diameters up to ½ inch. With a shaft surface finish which is rougher, it has been found that the ridges on the shaft surface tend to break off and become embedded in the bearing. These embeded particles tend to act as a grinding wheel against the shaft, tending to score the shaft.

It has been experienced that if the force of the punch on the crimps 39 is such that the crimps 39 penetrates too greatly the hard surface of the Delrin plastic, detrimental deformation of the plastic occurs because the hole 15 becomes out of round at its upper end portion (FIG. 3). While the crimps 39 are localized, as seen in FIG. 2, their contacting surface against the plastic bearing is rounded and not sharply pointed. The crimps 39, however, leave undisturbed, throughout its major extent, the space 65 between the spherical and the inner surface of the pilot from the zone of line contact on the seat 42 upwardly (FIGS. 1, 3 and 7). This allows the entrance and exit of cooling air into the open ended ducts 75 (defined between the crimps 39 and together forming the space 65) and its circulation between the bearing 12 and the retainer 14 (FIG. 3), both within one of the ducts 75 and between adjacent ducts.

The self-aligning bearing unit 10 is assembled to the sheet metal plate 16 having the hole or bore 52 defined by generally vertical walls by supporting the plate 16 upon an anvil 72 (FIG. 8), having a suitable hole to accommodate the portion of the retainer 14 extending below the lower surface of the plate, but supporting the plate 16 close to the edge of the hole 52. The bearing unit 10 is dropped into the hole 52 by placing the forward end or the end of the pilot 36 of smallest outside diameter into the hole 52 first. The retainer 14 centers itself automatically in the hole 52 due to the engagement of a portion of the outer interference surface 51 with the plate wall defining the hole 52. Thereafter a punch drives the head 38 of the retainer 14 so that the head becomes embed in the plate 16 with the top of the head flush with the top surface of the plate (relative to the position shown in FIG. 8).

Referring to FIG. 4, there is illustrated a modified bearing unit 10A in which the outer surface of the bearing 12A and the collar 32A have been modified. The outer surface of the bearing 12A has been modified so that a first spherical portion 20A cooperates with crimps 39A and a second spherical portion 20B cooperates with the tapered seat 42A but the two portions 20A and 20B are separated by a cylindrical portion 20C of smaller diameter than the spherical portions. The arcuate extent of surfaces 20A and 20B are sufficient for the required rocking movement of the bearing 12A.

The use of the cylindrical portion 20C increases the volume of the space 65A and ducts 75A, aiding in cooling the bearing 12A. As will be understood, an undercut annular recess could be provided on the outer surface occupied by the cylindrical portion 20C to further increase the volume of the space 65A but this is not illustrated. Also, the outer surface of the bearing 12A between the collar 32A and the collar at the other end could be provided with longitudinally extending ribs or serrations forming longitudinal surface grooves which would place the spaces 65A and 66A in communication with each other, but this is also not illustrated. In the latter modification the line contact by the seat 42A would be intermittent circumferentially, since it would be interrupted by the longitudinal grooves. Also, the crimps 39A would be positioned to rest on the outer bearing surface between the longitudinal grooves. The collar 32A is made larger than in the bearing of the previous embodiment and provided with a tapered surface defining a thrust bearing surface 18B and a generally conical volume in communication with the hole 15A so that the latter does not extend through the lower end of the bearing. A circular well 19A is provided at the apex of the surface 18B for holding lubricating oil, if desired, and for accommodating the pointed end of the shaft so that the pointed end thereof need not be cut off to assure proper seating of the tapered shaft end with the tapered surface 18B.

However, due to the high anti-friction qualities of the plastic materials, and particularly Delrin, used for the bearing 12 little or no lubrication of the shaft is needed. If desired, the Delrin plastic may be immersed in oil prior to assembly of the bearing 12 to the retainer 14 for traping in the pores of the plastic a certain amount of the oil for lubrication purposes.

Referring to FIG. 9, a further modification of this invention is illustrated adapted for use as a stand-off or insulator spacer 92. The stand-off 92 comprises a cylindrical Delrin plastic insert 94 held captive by an integral cylindrical flange 93 in a retainer 95, the plastic insert 94 having a central hole 91 which extends through the insert at the lower end.

The retainer 95 is similar to the one previously described in that it comprises a head 96 and a pilot 97 separated by a recess 98. The retainer has a bore 99 defined in part by a cylindrical surface 100 and a shoulder 102. The pilot 97 has an upper portion 89 of smaller outer diameter than the lower portions 88, the upper portion defining a smaller wall thickness to facilitate bending thereof against the flange 93 and entrance into the hole 106 in plate 108.

The flange 93 is seated on the shoulder 102 and is held securely on this shoulder by the upper bent pilot portion 89 which encompasses and is forcefully bent into tight frictional contact against the upper surface of the flange 93 and the outside surface of the plastic insert above the flange 93 to secure the plastic insert 94 to the retainer 95 and to prevent relative movement therebetween. At spaced intervals about the flange, the upper pilot portion 89 is deformed into crimps 111 to penetrate both the flange 93 and the vertical cylindrical outside surface, as illustrated in the right hand side in FIG. 9. The left hand side in FIG. 9 is a section of the flange and pilot between the crimps 111.

Prior to bending of the pilot portion 89, this portion of the retainer extends longitudinally, similarly to the upper portion in FIG. 5. The pilot portion 89 is bent into secure engagement with the flange by a punch, similar to that illustrated in FIG. 8.

The pilot portion 88 has a tapered outer surface 105 proportioned to provide an interference fit (as described for the first embodiment of this invention) with the hole 106 in the sheet metal plate 108, for centering the retainer 95 with respect to the hole 106. As stated previously, this interference fit is not great enough to materially impair the driving of the head 96 into the sheet metal plate, the head being also provided with knurls.

Referring to FIG. 9 it is noted that the cylindrical outer surface of the plastic insert 94 is in abutment with the cylindrical inner surface 100 of the retainer due to the slidable fit between these two surfaces for locating the center of the plastic insert with respect to the center of the hold 106 in the sheet metal plate 108. Also, the upper outer peripheral edge of the flange 93 is chamfered, as illustrated, to facilitate bending of the portion 89.

The stand-off is used by placing an added sheet metal plate (not illustrated) against the upper end face of the stand-off and inserting a screw (not shown) into a hole in the added plate and into the hole 91 of the stand-off. The hole 91 is partially threaded at its upper end and when the threads of the screw engage the unthreaded part of the insert, the screw tends to be locked by the plastic, the inner diameter of the plastic being such that the screw cuts a thread of about one half its depth, as shown by the smaller inner diameter of the unthreaded part of the hole 91 as compared with the depth of the tread in the threaded part.

It is seen that since the central hole in the device illustrated in FIG. 9 extends through the plastic insert, the device can be used as an insulated feed-through for an electrical wire, but this is not illustrated, in which case the illustrated threads may be omitted.

Having described my invention, what I claim is:

1. In combination, a sheeted plate, a self-aligning bearing unit for a shaft comprising an open ended retainer, and a plastic bearing having a surface defining a central hole to receive said shaft, said retainer comprising a head driven flush with the surface of said plate to which the retainer is secured and a pilot, said pilot having a tapered outer surface which decreases in diameter as the length of the tapered outer surface increases away from said head, said plate having a bore to receive said retainer, said pilot being proportioned relative to said bore in the plate to which said retainer is to be secured so that an interference fit results between said tapered outer surface and the portion of said pilot defining said bore after said pilot has been inserted partially into said bore for centering the retainer with respect to said bore, said interference fit not being great enough to materially interfere with successful driving of said retainer into said plate, said bearing having an outer surface forming a part of a sphere, said retainer having a central inner surface including a tapered seat in line contact with a portion of the bearing spherical outer surface, said tapered seat being disposed to one side of the medial plane of said spherical surface for preventing axial movement of the bearing relative to the retainer in one direction, said inner surface of the retainer being staked into sufficient frictional contact at spaced intervals about the periphery of the retainer on the other side of said medial plane to restrain rotation of the bearing and prevent axial movement of the bearing relative to the retainer in the direction opposite to that first mentioned, said retainer inner surface being spaced from said bearing outer surface at all other places, whereby said bearing may align itself with the shaft upon misalignment of the longitudinal axes of the retainer and of the shaft, and the space from the line contact to the staked periphery between the outer surface of the bearing and the inner surface of the retainer forming ducts open at the staked peripheral end of the retainer and in communication with each other for the circulation of cooling air therethrough, the line contact and the staked periphery aforementioned being provided at opposite end portions of said pilot, whereby upon thermal expansion of said plastic bearing it expands radially into the spaces between the bearing and the retainer.

2. The structure recited in claim 1 wherein the inner retainer surface includes an annular portion between the tapered seat and the end of the retainer on the same side of said medial plane to define the space between the tapered seat and this end of the retainer jointly with a portion of the bearing outer surface, and the interference fit is provided radially outwardly of this annular portion, whereby deformation of the retainer due to the interference fit is not imposed on the plastic bearing.

3. The structure recited in claim 1 wherein the stakes penetrate the spherical surface enough to restrain rotation of said bearing including upon thermal expansion radially inwardly thereof but not enough to deform the hole out of round sufficiently to materially impair the bearing function of the plastic bearing.

4. A self-aligning bearing unit for a shaft comprising an open-ended retainer, and a bearing having a central surface defining a hole to receive said shaft, said retainer comprising a head adapted to be driven flush with a surface of a sheeted plate to which the bearing unit is to be secured and a pilot with an annular undercut recess therebetween for receiving the plate material displaced by the head when so driven, said pilot including an annular portion having a tapered outer surface which decreases in diameter as the length of the pilot increases away from said head, said pilot tapered surface being proportioned relative to a bore in the plate to which said retainer is to be secured so that an interference fit results between said annular portion and said bore after said pilot is inserted partially into said bore for centering the retainer with respect to said bore but said interference fit not being great enough to materially interfere with successful driving of said retainer into said plate, said bearing having an outer surface forming a part of a sphere, said retainer having an inner surface which is centrally recessed in part to received said outer surface of said bearing and permit arcuate rocking movement of the bearing about a transverse medial axis but preventing axial movement of the bearing relative to the retainer, said inner surface of said retainer being spaced from said outer surface of said bearing except that at one end of said retainer said inner surface forms a seat engaged by said bearing outer surface and at the other end of said retainer said retainer is staked, at spaced intervals along its periphery, into frictional contact with said bearing outer surface to bias said bearing toward said seat and to define ducts for cooling air between said spaced bearing outer surface and the retainer inner surface, whereby said bearing may align itself with said shaft upon misalignment of the longitudinal axes of the retainer and the shaft.

5. The structure recited in claim 4 wherein said bearing has a longitudinally extending collar at the end of the bearing adjacent the head, said inner surface of said retainer forms a retainer collar surrounding said bearing collar but of larger inner diameter to allow angular rocking movement of the longitudinal axis of said bearing relative to the longitudinal axis of the retainer, said movement being limited due to the abutment of portions of said collars with each other to prevent the bearing from turning to positions where the hole in the bearing for the shaft is not accessible to the shaft.

6. The structure recited in claim 4 wherein said pilot includes a deformable annular portion adjacent said undercut recess and radially spaced from said bearing, whereby deformation of the pilot due to the interference fit is not imposed on the bearing.

7. In combination, a sheet metal and a self-aligning bearing unit secured to said sheet metal plate comprising an open-ended retainer, a plastic bearing having a bearing surface defining a hole to receive a shaft, said retainer comprising a head driven flush with a surface of said sheet metal plate to which the retainer is secured and a pilot with an annular undercut recess therebetween for receiving the plate material displaced by the head when so driven, said pilot having a uniformly tapered outer surface which decreases in diameter as the length of the pilot increases from the recess to the end of the pilot away from said head, said sheet metal plate having a bore to receive said retainer, said plastic bearing having an outer surface forming a part of a sphere, said retainer having a recessed inner surface receiving said outer surface of said plastic bearing and permitting arcuate rocking movement of the bearing about a transverse medial axis but preventing axial movement of the bearing relative to the retainer, said bearing aligning itself with the shaft upon misalignment of the longitudinal axes of the retainer and the shaft, said bearing having a longitudinally extending collar at the end thereof adjacent the head, said inner surface of said retainer forming, in part, a retainer collar surrounding said bearing collar but of larger inner diameter to provide a space for angular rocking movement of the longitudinal axis of said bearing relative to the longitudinal axis of the retainer and for deformation of the retainer, said movement being limited due to the abutment of portions of said collars with each other to prevent the bearing from turning to a position where the hole therein for the shaft is not accessible to the shaft, said pilot being proportioned relative to said bore in the plate to which said retainer is to be secured so that an interference fit results between said pilot and said bore after said pilot is inserted partially into said bore, said fit being radially outward of the space defined in part of the retainer collar for centering the retainer with respect to said bore, said fit not being great enough to materially interfere with successful driving of said retainer into said plate nor deforming said bearing due to the space between said bearing and said retainer collar, the other end of said bearing being formed with another longitudinally extending similar bearing collar and said retainer at this mating end being short enough to terminate upon a portion of the outer spherical surface of said bearing, whereby the bearing surface for said shaft is increased but said angular rocking movement is not additionally impeded until the first mentioned bearing collar (at the other end) abuts the associated retainer collar, said inner surface of said retainer being formed, in part, by a tapered seat disposed to one side of the medial plane of said spherical surface intersecting the longitudinal axis of the bearing but adjoining said retainer collar, a portion of said pilot on the other side of said medial plane being crimped at spaced intervals along its periphery against a portion of the outer surface of said bearing, the remainder of said inner surface of said retainer being spaced from the outer surface of said bearing except where said bearing is forced into line engagement with said tapered seat by said crimping, and said head being provided with a knurled periphery.

8. In combination, a sheeted plate, a retainer attachable to said plate, a device surrounded at least in part by said retainer and secured thereto, said retainer comprising a head driven flush with a surface of the plate and a pilot with an undercut recess therebetween receiving the plate material displaced by the head when so driven, said pilot having a tapered outer surface portion which increases in diameter as the length of the tapered portion increases away from the head, said plate having a bore, said tapered portion being proportioned relative to said bore so that an interference fit results with the portion of said plate defining said bore after said pilot is inserted partially into said bore for centering the retainer with respect to said bore but said interference fit not being great enough to materially interfere with successful driving of said retainer into said plate.

9. A bearing unit attachable to a sheeted plate comprising a retainer, an anti-friction bearing defining a hole to receive a shaft and said bearing being mounted within said retainer, said retainer comprising a flange adapted to be secured to the sheeted plate and a pilot with an undercut recess therebetween for receiving the plate material displaced by the head when so driven, said pilot having a tapered outer surface portion which decreases in diameter as the length of the tapered portion increases away from the head, said pilot tapered portion being proportioned relative to a bore in the plate to which said retainer is to be attached so that an interference fit results between the outer surface of said tapered portion and said bore after said pilot is inserted partially into said bore for centering the retainer with respect to said bore but said interference fit not being great enough to materially interfere with successful driving of said retainer into said plate, said pilot including a deformable annular portion spaced throughout its peripheral extent from the part of the bearing which it surrounds so that any possible deformation of said pilot during securement of the bearing unit to the sheeted plate is not imposed on the bearing.

10. A self-aligning bearing unit for a shaft comprising an open-ended retainer, and a bearing having a central surface defining a hole to receive said shaft, said retainer comprising a head adapted to be driven flush with a surface of a sheeted plate to which the bearing is to be secured and a pilot with an annular undercut recess therebetween for receiving the plate material displaced by the head when so driven, said pilot including a tapered outer surface portion which decreases in diameter as the length of the pilot increases away from said head, said pilot tapered surface portion being proportioned relative to a bore in the plate to which said retainer is to be secured so that an interference fit results between said pilot tapered surface portion and said bore after said pilot is inserted partially into said bore for centering the retainer with respect to said bore but said interference fit not being great enough to materially interfere with successful driving of said retainer into said plate, said bearing having a recessed central inner surface receiving said outer surface of said bearing and permitting arcuate rocking movement of the bearing about a transverse medial axis but preventing axial movement of the bearing relative to the retainer, whereby said bearing may align itself with said shaft upon misalignment of the longitudinal axes of the retainer and the shaft, the inner surface of said retainer being formed, in part, by a tapered seat disposed to one side of the medial plane of said spherical surface intersecting the longitudinal axis of said bearing, a portion of said pilot on the other side of said medial plane being crimped at spaced intervals along its periphery against a portion of the outer spherical surface of said bearing to engage said bearing for restraining rotation of the bearing relative to the retainer, but the remainder of the said inner surface of said retainer remaining spaced from the associated outer surface of said bearing except where said bearing is forced into line engagement with said tapered seat, whereby ducts for cooling air are formed between the spaced inner surface of said retainer and the associated outer surface of said bearing.

11. A self-aligning bearing unit for a shaft comprising an open-ended retainer, and a bearing having a central surface defining a hole to receive said shaft, said retainer comprising a flange adapted to be secured to a sheeted plate to which the bearing unit is to be secured and a pilot with an annular undercut recess therebetween for receiving the plate material displaced by the flange, said bearing having an outer surface forming a part of a sphere, said retainer having an inner surface which receives said outer surface of said bearing and permits arcuate movement of the bearing about a transverse medial axis but prevents axail movement of the bearing relative to the retainer, said inner surface of said retainer being spaced from said outer surface of said bearing except that at one end of said retainer said inner surface forms a seat engaged by said bearing outer surface and at the other end of said retainer said retainer is staked, at spaced intervals along its periphery, into frictional contact with said bearing outer surface to bias said bearing towards said seat and to define ducts for cooling air between the so spaced bearing outer surface and the retainer inner surface, whereby said bearing may align itself with said shaft upon misalignment of the longitudinal axes of said retainer and said shaft.

References Cited by the Examiner

UNITED STATES PATENTS

| | | | |
|---|---|---|---|
| 1,275,576 | 8/1918 | Lockwood | 29—148.4 |
| 2,061,758 | 11/1936 | Eastman | 308—72 |
| 2,427,072 | 9/1947 | Rubin | 29—148.4 |
| 2,638,389 | 5/1953 | Whiteley | 308—72 |
| 2,717,792 | 9/1955 | Pelley | 248—56 X |
| 2,767,034 | 10/1956 | McCloskey | 308—72 |
| 2,794,691 | 6/1957 | Noe | 308—72 |

(Other references on following page)

UNITED STATES PATENTS

| | | | |
|---|---|---|---|
| 2,823,962 | 2/1958 | Leonard. | |
| 2,884,283 | 4/1959 | Korol | 308—15 |
| 2,895,769 | 7/1959 | Dwyer | 308—72 |
| 2,932,081 | 4/1960 | Witte | 29—149.5 |
| 2,943,373 | 7/1960 | Rapata | 24—216 |
| 2,958,927 | 11/1960 | Kravats | 29—149.5 |
| 2,990,579 | 7/1961 | Hendry | 18—30 |
| 3,025,567 | 3/1962 | Sherman | 18—30 |
| 3,033,624 | 5/1962 | Biesecker | 308—15 |
| 3,141,231 | 7/1964 | Davies | 308—72 |

FOREIGN PATENTS 815,685   7/1959   Great Britain.

DAVID J. WILLIAMOWSKY, *Primary Examiner.*

FRANK SUSKO, ROBERT C. RIORDON, DON A. WAITE, *Examiners.*

H. S. KIESER, *Assistant Examiner.*